United States Patent [19]

Bräckow

[11] 3,798,942

[45] Mar. 26, 1974

[54] DEVICE FOR CONTINUOUS MEASUREMENT OF THE TEMPERATURE OF THE EXTRUDED MATERIAL IN EXTRUSION OF METALS IN SECTIONS AND TUBES

[75] Inventor: Joachim Bräckow, Singen, Hohentwill, Germany

[73] Assignee: Swiss Aluminium Ltd., Chippis, Switzerland

[22] Filed: July 18, 1972

[21] Appl. No.: 272,886

[30] Foreign Application Priority Data
July 20, 1971 Switzerland............................ 10636

[52] U.S. Cl..................................... 72/13, 72/253
[51] Int. Cl............................................ B21b 37/10
[58] Field of Search.......... 72/13, 10, 11, 12, 3, 253

[56] References Cited
FOREIGN PATENTS OR APPLICATIONS
547,080   8/1942   Great Britain.......................... 72/13

Primary Examiner—Charles W. Lanham
Assistant Examiner—Robert M. Rogers
Attorney, Agent, or Firm—Ernest F. Marmorek

[57] ABSTRACT

The invention relates to a device for continuous measurement of the temperature of the metal flowing in the shape-determining aperture of the die in extrusion of sections and tubes, consisting of a thermo-electric element introduced in the substantially radial direction through the die holder and the die to the shape-determining die aperture, the tip of which is so adjustable that it lies in a plane with the working surface of the shape-determining die aperture and is in direct contact with the surface of the metal flowing in this aperture, and which is connected by a lead with a temperature indicating or press speed regulating device, as well as a holding and adjusting device for the thermoelement.

7 Claims, 1 Drawing Figure

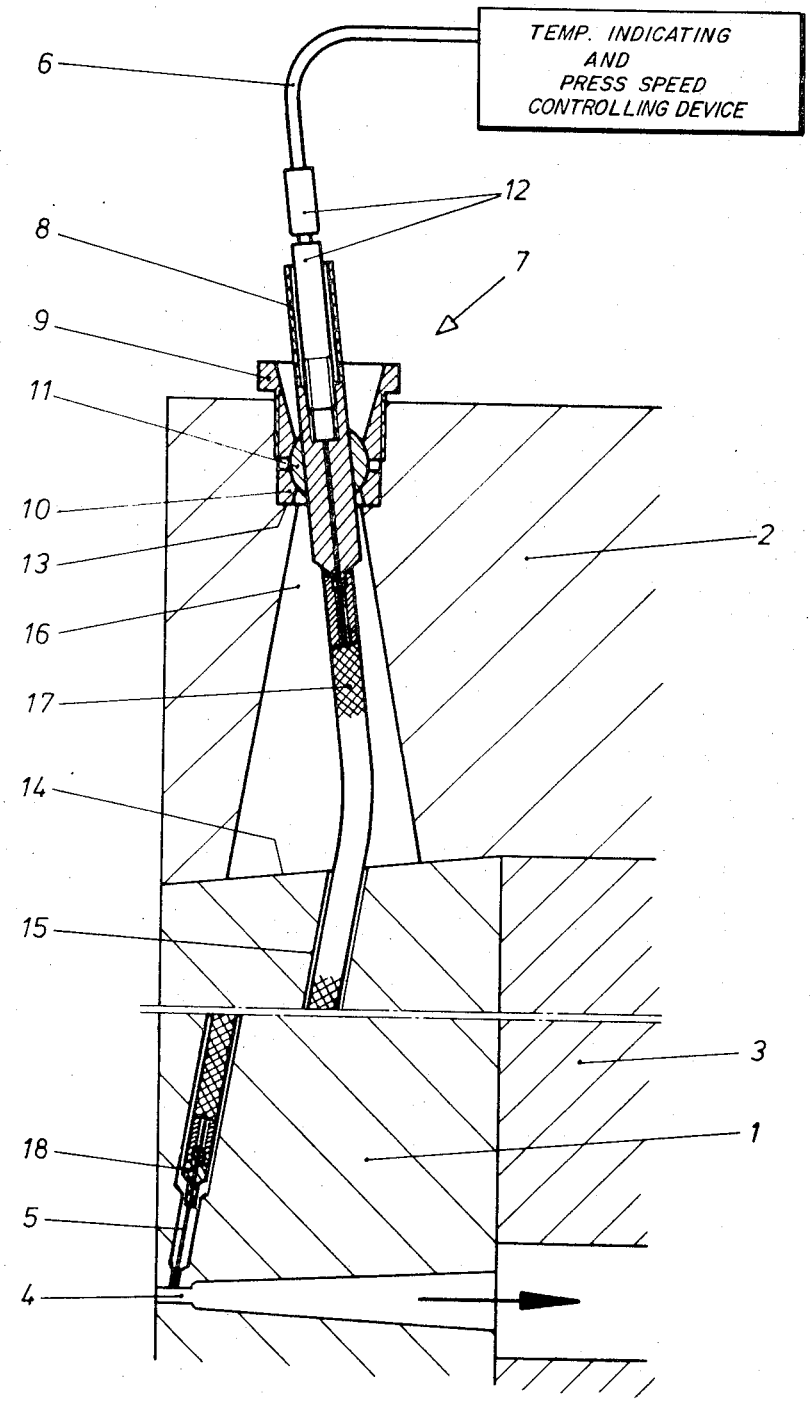

DEVICE FOR CONTINUOUS MEASUREMENT OF THE TEMPERATURE OF THE EXTRUDED MATERIAL IN EXTRUSION OF METALS IN SECTIONS AND TUBES

The invention relates to a device for continuous measurement of the temperature of the metal flowing in the shape-determining aperture of the die in extrusion of sections and tubes, consisting of a thermo-electric element introduced in the substantially radial direction through the die holder and the die to the shape-determining die aperture, the tip of which is so adjustable that it lies in a plane with the working surface of the shape-determining die aperture and is in direct contact with the surface of the metal flowing in this aperture, and which is connected by a lead with a temperature indicating or press speed regulating device, as well as a holding and adjusting device for the thermoelement.

The reliable and continuous measurement of these temperatures is an old requirement in the field of extrusion. Hence various proposals have already been made for its solution, which principally should permit a reliable determination of the temperature at the critical point in the shape-determining die aperture by direct contact of the measuring instrument with the extruded material, while, however, an injury of the extruded material surface by the measuring instrument should be avoided.

A recent proposal by the applicants for solution of this problem (Swiss Pat. No. 507,752) sets out to so arrange a thermo-electric element in a bore formed substantially radially in the die itself, by means of a holding and adjusting device screwed into the die, that its tip can be adjusted so finely that it lies in a plane with the working surface with the shape-determining die aperture.

The results obtained with this device were very satisfactory, as regards accuracy of measurement and control of the press speed. But it appeared as a disadvantage that in order to be able to incorporate and operate the adjusting device screwed into the die, the bore in the die holder must extend as an exact prolongation of that in the actual die body. That signifies that for each die a special die holder was necessary and also a thermo-electric element matching in length; for according to the shape of the cross section to be extruded and the number of shape-determining apertures present in one die the openings of the bores on the exterior of the die lie differently and the bores are of different length. Furthermore the operation of the adjusting device is also complicated in that the adjusting screw, which can indeed be operated if the die holder are united, lies in the depth of the bore. And finally the die is greatly weakened by the bore which, since it has to receive the entire holding and adjusting device, must be of considerable width.

A solution therefore had to be sought which, with maintenance of the advantages of the preceding proposals, would make it possible to employ the same die holder for several dies with variously arranged bores and the same thermo-electric element for bores of differing lengths, which makes possible an easier accessibility of the adjusting device and which avoids a great weakening of the die.

The invention is characterised in that the holding and adjusting device for the thermo-electric element is screwed into the exterior of the die holder, and by means of a ball joint permits a universal swinging of the flexible thermo-electric element, and in that the bore in the die is substantially cylindrical and is contracted in at least one step and permits movement of the thermo-electric element only in the direction of its longitudinal axis.

The invention will be explained with refernece to the accompanying drawing by way of an example. The drawing shows a longitudinal section through the shape-determining part of an extrusion press with the temperature-measuring device built in.

The die 1 is held in the press by the die holder 2 and the die support 3. The metal (not shown) is extruded in the direction of the arrow the shape-determining opening 4 in the die 1.

Through the die holder 2 and the die 1, to the shape-determining aperture 4 in the die 1, there is introduced the thermo-electric element 5, serving for temperature measurement. From its entry into the die holder towards the exterior, the thermo-element is connected by the lead 6 with a temperature indicating or a press speed regulating device (not shown), preferably automatic.

The adjusting and holding device 7 for the thermo-electric element is screwed into the exterior of the die holder 2. It consists of the thermo-electric element holder 8, the clamping nut 9, the clamping ring 10 and the ball joint 11. The thermo-electric element holder is externally substantially cylindrical. In its interior it has an axial through bore in which is guided the thermo-electric element. In its part facing towards the die this bore is only so broad that the thermo-electric element can slide in it in the direction of its longitudinal axis. The part of the bore directed outwards is enlarged in two steps, while the inner narrower step carries a fine thread. This fine thread serves for the fine adjustment of the thermo-electric element. Into it there is screwed the intermediate piece 12 with a similar fine thread. The intermediate piece also forms the connection between the thermo-electric-element 5 and the lead 6. Advantageously the intermediate piece is in two parts, while two parts can be united or separated by a plug connection. The possibility of separation facilitates the installation of the thermo-electric element and its fine adjustment.

The clamping nut 9 is screwed into the die holder 2 perpendicularly to the extrusion axis. It has a bore which in axial longitudinal section is hour-glass shaped. At a distance from the end of the clamping nut facing towards the die there lies the clamping ring 10 against an internally projecting shoulder 13 of the bore, in which the clamping nut 9 engages. This also has an axial internal bore which in longitudinal section is hour-glass shaped. The surfaces of the bores in the clamping nut and clamping ring which face towards one another are preferably formed concave, corresponding to the exterior of the ball joint 11; for the ball joint is held and clamped tight between these surfaces facing one another. The ball joint 11 has an axial cylindrical bore, the diameter of which is matched to the external diameter of the thermo-element holder 8. Furthermore a slit is formed in the ball joint starting from the cylindrical bore, extending in the direction of the longitudinal axis of the thermo-electric element 5, and penetrating to the exterior of the ball joint.

During assembly the thermo-electric element holder is first inserted through the cylindrical bore of the ball joint. Then the clamping nut is tightened up so that the ball joint is clamped tightly between the clamping nut and clamping ring. Simultaneously however the ball joint itself is pressed together. The slit which has been formed in it permits the ball to yield to this force to a certain extent, i.e. until the slit is fully closed. In consequence the diameter of the bore in the ball diminishes, so that the thermo-electric element holder consequently is clamped. By greater or less deep insertion of the thermo-electric element holder before the total tightening of the clamping screw one obtains a stepless coarse adjustement of the depth of penetration of the thermo-electric element inserted into the die.

But now in order that the thermo-electric element, starting from the same place in the die holder, can reach bores 15 in the die which open at various places on the die exterior 14, the thermo-electric element holder is also pivotal in all directions in the holding and adjusting device. This is solely made possible by the ball joint 11, in that the surfaces of the hour-glass shaped bores in the clamping nut and clamping ring facing each other diverge conically from one another; furthermore, in that the bore 16 in the die holder have a shape that allows this pivoting of the holder 8 in all directions. Thus in the exemple (drawing) this bore 16 likewise conically broadens from the internally projecting shoulder 13 towards the die. But the shape of the bore 16 could also be, e.g. cylindrical or cylindrical-conical. By tightening of the clamping nut the thermo-electric element holder and with it the thermo-electric element is fixed at the desired angle. Of course the pivotability of the thermo-electric element holder and thus of the thermo-electric element itself is limited by the form, e.g. by the extent of the conicity of this bore. But it thus allows a whole range of dies with bores 15 opening at different places to be assembled with the same die holder, which after all signifies a significant economy.

But now it has been found, that the axes of the thermo-electric element secured in the die holder and of the bsre 15 in the die cannot be so brought to coincidence that the one axis constitutes the direct prolongation of the other, but that they intersect at a certain angle. Hence the thermo-electric element must be able to adapt itself to such an alteration of direction, i.e. be flexible. In order now that it should not be damaged on insertion in the guides having different axes and the ready adjustability of the thermo-electric element should not be influenced by friction on the bore walls, it is advantageously surrounded with a protective shroud 17. This protective shroud can for example be so formed in that one pushes three plaited hoses of wire over one another. In doing this, the innermost lying hose is reduced in its diameter by strechting and the outer is enlarged in diameter by compression. After beeing pushed over one another, the plaited wire hoses are firmly connected to one another e.g. by soldering. In this way one can in the provision of the plaited wire hoses restrict oneself to a single diameter. This protective shroud is fixedly connected with the thermo-electric element holder e.g. by soldering. At the free end of the thermo-electric element the protective shroud is in the same way connected with the end piece 18. This end piece can for example be a part produced by turning, the external diameter of which is so dimensioned that it guides the protective shroud into the bore 15 in the die, and which also has an axial bore for the reception of the thermo-electric element. The protective shroud constructed in this manner is sufficiently firm for its purpose, but also sufficiently flexible. It permits an axial deviation of the bores in the die holder and in the die up to 45° without the adjustability of the thermo-electric element beeing influenced.

The bore 15 in the die is cylindrical in cross section and over the greater part of its length of such a diameter that the protective shroud 17 or the end piece 18 can slide in it. At its end towards the shape-defining aperture of the die it must however be so strongly contracted, advantageously in the from of a step, that its diameter is only to a slight extent greater than that of the thermo-electric element, in order that its tip receives a satisfactory guiding.

With this device it is possible, with retention of all the advantages given by the previous proposal of the Applicants, to measure the temperature at the truly significant place, with practically all section shapes which arise, with a small number of thermo-electric elements of different lengths, from a single place on the circumference of the die holder.

What is claimed is:

1. Device for continuous measurement of the temperature of the metal flowing in the shape-determining aperture of the die in extrusion of sections and tubes, consisting of a thermo-electric element carried in substantially radial direction through the die holder and the die right to the shape-determining die aperture, the tip of which is so adjustable that it lies in a plane with the working surface of the shape-determining die aperture and in direct contact with the surface of the metal flowing in this aperture, and which is connected by a lead with a temperature indicating and a press speed controlling device, as well as of a holding and adjusting device for the thermoelement, characterised in that the holding and adjusting device (7) is screwed into the exterior of the die holder (2), and by means of a ball joint (11) permits a swinging in all directions of the flexible thermoelement (5) and in that the bore (15) in the die is substantially cylindrical and is contracted in at least one step and permits movement of the thermo-element (5) only in the direction of its longitudinal axis.

2. Device according to claim 1, characterised in that the holding device (7) consists of a clamping nut (9) engaging from outside into the die holder (2) and provided with an axial bore which is hour-glass shaped in longitudinal section, and a clamping ring (10) which abuts against an internally projection shoulder (13) of the bore (16) in the die holder (2), likewise provided with a bore which is hour-glass shaped in longitudinal section, which hold the ball joint (11) between them, and a substantially cylindrical thermo-electric element holder 8.

3. Device according to claim 2, characterised in that the ball joint (11) has a smooth cylindrical bore, through which the thermo-electric element holder (8) is inserted, and a slit which starts form the cylindrical bore, extends in the direction of the longitudinal axis of the thermo-electric element, and penetrates to the exterior of the ball joint (11).

4. Device according to claim 2, characterised in that the thermo-electric element holder (9) is provided with an axial bore which, in its part towards the die (1), corresponds to the external diameter of the thermo-electric element (5), and in the part towards the exterior is enlarged, and that the enlarged part at its end towards the die (1) has a fine thread for the fine adjustment of a thermo-electric element, in which there engages a cylindrical intermediate piece (12) connecting the thermo-electric element (5) with the lead (6).

5. Device according to claim 4, characterised in that the intermediate piece (12) is in two parts and that the parts are held together by a plug connection.

6. Device according to claim 1, characterised in that the flexible thermo-electric element (5), between its exit from the thermo-electric holder (8) and an end piece (18) guiding the free end of the thermo-electric element (5) in the cylindrical bore in the die (1), is surrounded by a flexible protective shroud, (17) which is fixedly connected both with the thermo-electric element holder and with the end piece (18).

7. Device according to claim 4, characterised in that the flexible protective shroud (17) consists of three plaited wire hoses pushed over one another, of which the inner is reduced in its diameter by stretching and the outer is enlarged in its diameter by compression.

* * * * *